(12) United States Patent
Chen et al.

(10) Patent No.: US 9,819,501 B2
(45) Date of Patent: Nov. 14, 2017

(54) POWER SOURCE EQUIPMENT AND POWER SUPPLYING METHOD FOR POWER OVER ETHERNET SYSTEM

(71) Applicant: IC Plus Corp., Hsinchu (TW)

(72) Inventors: Chung Cheng Chen, Hsinchu (TW); Chuan Ching Yu, Hsinchu (TW)

(73) Assignee: IC Plus Corp., Hsinchu (TW)

( * ) Notice: Subject to any disclaimer, the term of this patent is extended or adjusted under 35 U.S.C. 154(b) by 126 days.

(21) Appl. No.: 15/077,425

(22) Filed: Mar. 22, 2016

(65) Prior Publication Data

US 2017/0214533 A1  Jul. 27, 2017

(30) Foreign Application Priority Data

Jan. 26, 2016  (TW) .............................. 105102420 A (51) Int. Cl.
*H04L 12/10*  (2006.01)
(52) U.S. Cl.
CPC .................................. *H04L 12/10* (2013.01)

(58) Field of Classification Search
CPC ..................................................... H04L 12/10
See application file for complete search history.

(56) References Cited

U.S. PATENT DOCUMENTS

| 7,856,561 | B2 | 12/2010 | Stineman, Jr. et al. |
| 8,412,961 | B2 | 4/2013 | Gammel et al. |
| 9,639,135 | B2 * | 5/2017 | Brooks ..................... G06F 1/28 |

* cited by examiner

*Primary Examiner* — Hai L Nguyen
(74) *Attorney, Agent, or Firm* — Muncy, Geissler, Olds & Lowe, P.C.

(57) ABSTRACT

A power source equipment for Power over Ethernet system provides an adjustment mechanism for the maximum allowable power of communication port connected to the power source, whereby when a device requests to join as a powered device but a maximum allowable power of a corresponding class is greater than the difference of the total supplied power and the sum of maximum allowable power designated to the then connected powered devices, the maximum allowable power of the respective powered devices may be adjusted, to generate sufficient allowable power for the requesting device. A power supplying method using the adjustment mechanism is also disclosed.

10 Claims, 3 Drawing Sheets

POWER SOURCE EQUIPMENT AND POWER SUPPLYING METHOD FOR POWER OVER ETHERNET SYSTEM

CROSS REFERENCE TO RELATED APPLICATIONS

This non-provisional application claims priority under 35 U.S.C. §119(a) on Patent Application No(s). 105102420 filed in Taiwan, Republic of China on 2016 Jan. 26, the entire contents of which are hereby incorporated by reference.

FIELD OF INVENTION

The present invention relates generally to a power over Ethernet system, and more particularly to an inspection device and method for dynamically adjusting supplied powers, in order to add a new powered device in a power over Ethernet system.

RELATED ART

Power over Ethernet (PoE) has been found widespread application in many areas. For example, IEEE has released two standards that relate to PoE-IEEE 802.3af in 2003 and IEEE 802.3at in 2009. These standards are adopted by many applications. In this disclosure, these relevant standards relevant to the PoE will be referred to as the "PoE standard" hereinafter. PoE technology allows supplying electric power through Ethernet to devices such as Internet phones, wireless access points, network cameras, hubs, and even computers without the need of extra power outlet. Combining data transmission and power supply, PoE technology can reduce the cost and complexity of the overall network computing system.

In a power over Ethernet (PoE) system, the electric power is provided by the power source equipment (PSE) via Ethernet data cable to the powered device (PD). The power source equipment may include an Ethernet switch, a router, or other network switching and midspan devices. In the PoE system, a powered device is connected to the network and configured to obtain or request power from the power source equipment over the network.

In a PoE system, the power source equipment may connect to multiple powered devices through their network connecting ports, but may also connect to devices that will not or cannot obtain power from the power source equipment. In a real application, the powered device may include devices that are in compliance with the PoE Standard, and devices that are compatible with the PoE Standard. The PoE Standard provides that, before a power source equipment may provide power to a powered device, the power source equipment must determine whether the particular powered device is in accordance with the PoE standard. In addition, most of the power source equipment, or the power supply equipment that incorporates power source equipment, will also determine whether a device is compatible with the PoE standard. This may include a legacy device that is compatible with the PoE Standard. If compatible, the power source equipment will also provide power to such compatible device.

Under the PoE standard, when carrying out said detection, the power source equipment provides a signal to the connecting port of a target device, and detects the response signal from the connecting port. If the response signal indicates a signature resistance ranging from 19 k to 26.5 k ohms, then the device is determined to be a powered device in compliance with the PoE standard, i.e., a qualified powered device. The PoE Standard also specifies that the voltage provided by the power source equipment should be between about 2.8 V and 10 V, the current should be less than about 5 mA, and the voltage difference of the testing signal should be more than 1 V.

During the detection, a typical method is for the power source equipment to apply a voltage or current to the particular connecting port, and then to measure the response signal from the target device after a predetermined period. The signature resistance is calculated based on the current/voltage relationship from the two signals. If a current is applied, the current is normally in the range of 150 μA to 400 μA, and the voltage of the connecting port is measured to calculate the value of the signature resistance. In this case, a target device in compliance with the PoE standard will cause the power sourcing device to detect an about 2.8 V to 10 V voltage drop in the connecting port.

Alternatively, if the testing signal is a voltage signal, the voltage is generally between about 2.8V to 10V, and the detected current value shall be between about 87.5 uA to 625 uA.

Based on the result, the power source equipment will decide whether to perform classification on the powered device. From the classification, the power source equipment may provide different power levels to different powered devices.

To classify the powered device, the IEEE 802.3 of/at standard provides five classes (classes 0, 1, 2, 3, and 4) with respective power consumption upper limits (15.5 W, 4 W, 7 W, 15.5 W and 30 W). In reality, many powered devices with low power consumption will also label themselves as high power device. For example, a powered device with a normal power range of 7 W may label itself as class 4. This is to prevent the operation of the powered device being discontinued due to power supply limit from the power source equipment of the PoE system. This, however, will also cause the power supply equipment to reserve 30 W for the powered device. Since the powered device only uses 7 W, the remaining reserved power will not be able to be allocated to other powered devices connected to the connecting port, thereby causing power allocation waste.

Specifically, when a power source equipment is to supply power to a newly-added powered device, it will sum the allocated power values of all connected powered devices that it currently supplies power to. It will then compare the summed value with the total power supply value that the PoE system is capable of supplying. The difference of the two is then to be compared with the newly-added powered device based on its classification. If the power allocation requested is greater than the difference, then no power will be supplied to the newly-added powered device, or the power supplied to a connected powered device with lower priority will be stopped. Once stopped, the sum of the difference and the power allocation values of the stopped device, or part of the sum thereof, will be allocated to the newly-added powered device. In some cases, the newly-added powered device may only need 7 W but still labels itself with high power level. This will cause the PoE system not being able to supply power to the newly-added powered device, or may cause the PoE system stop supplying power to another with lower priority.

In order to improve the efficiency of power supply, a known technique is to calculate the total power consumption of all powered devices and, if the total is greater than the maximum power supply of the power source equipment, power supply to one or some connecting port is shut down so to make the total power consumption lower than the maximum power supply and to maintain other connecting ports in normal operation. However, in a power over Ethernet system with multiple connecting port, sometimes it is necessary to inspect a powered device provided in another IC through a low-speed interface, in order to determine the power consumption of this powered device. Under this situation, the power source equipment would not have sufficient time to shut down the necessary one or some connecting port, before the total power consumption exceeds the maximum power supply. Another known technique is used in a PoE system that measures the real power consumption of the powered devices and shuts down power supply to a powered device, when its real power consumption is greater than a predetermined threshold. In such a system, in case where a powered device with, for example, only 7 W power consumption but is labeled with class 4 specification, the system will lower the classification of the powered device to a lower one. For example, it may classify the powered device with the classification that has an upper power limit just above the real power consumption. This method will indeed increase the power allocation efficiency at that time, but can still cause powered devices to suffer power outage even when there is available power to supply.

Figure 3:
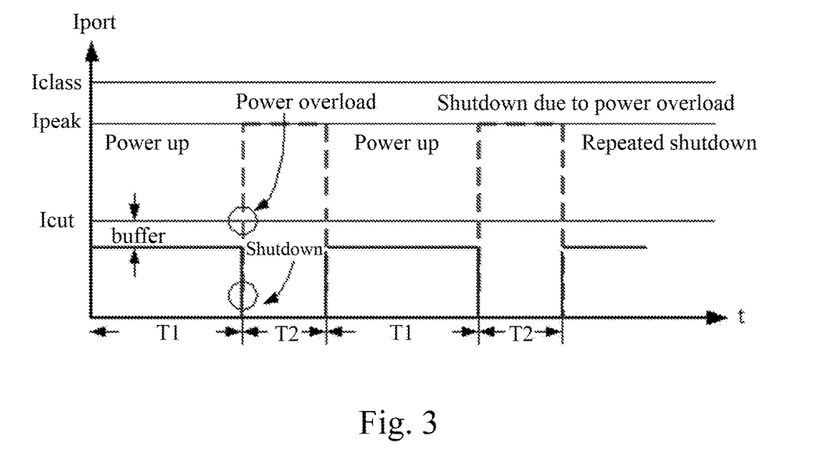
FIG. 3 shows a graph of the power consumption of a common powered device, i.e., a web cam.

For example, a common powered device is an IP cam. The power consumption of the powered device may be as illustrated in FIG. 3. As shown, when the system starts supplying power to the powered device, the powered device and the computer (server) will be engaging in connection setting at time T1, and will not need a full power to operate. At this moment, if the PoE system measures the actual power consumption of the powered device, it will mistakenly reduce its power classification. Now, when the IP cam wants to begin initiating a full data transmission or night lighting at time T2, the power consumption needs to be dramatically increased, as illustrated in the dash line in FIG. 3. Because the powered device now has a lowered classification, at time T2, the powered device may shot down due to power overload. Furthermore, when the PoE system re-supplies power to the IP cam the next time, the whole situation will repeat to cause the powered device to shut down again and again.

Yet there is no power source equipment of the PoE system that can overcome the inefficient power allocation due to the difference between the classification power allocation and the real power consumption. In addition, there current does not exist a power source equipment of the PoE system that can take the power value between the classification setting and the real power consumption and offer the power to the other powered devices, especially the powered devices with lower priorities.

SUMMARY OF THE INVENTION

It is an objective of the present invention to provide a novel power source equipment of the PoE system to dynamically monitor multiple powered devices in order to supply useful power to powered devices that needs power.

It is an objective of the present invention to provide a novel power source equipment of the PoE system that supplies extra reserved power to newly added powered devices from the difference between a total power allocation and a summed power consumption of all power-supplying powered devices.

It is an objective of the present invention to have a power source equipment to prevent repeat shutting down for power-supplying powered devices.

It is also an objective of the present invention to provide a power supplying method for power source equipment of the PoE system that provides these advantages.

According to the present invention, a power source equipment for a power over Ethernet (PoE) system is provided and comprises at least two connecting ports, each to be connected to a powered device via a network wire. The power source equipment further comprises an inspection device in connection with the respective connecting ports and configured to send detection signals to the connecting ports, to obtain a response signal from the corresponding connecting ports, after a predetermined period, and to determine based on the responding signal whether a particular connecting port has been connected by a target device and whether the connected device is a powered device is suited for supplying power. The power source equipment is further configured to send a classification signal to a connecting port determined to be in connection with a powered device, to obtain a classification response signal from the connecting port, after a predetermined period, and to determine a class associated with the powered device based on the classification response signal. The power source equipment is further configured to supply power to the powered devices according to classes determined in association with the powered devices.

The power source equipment further comprises a monitoring device, configured to allow the power source equipment to supply power to a connecting port connected with a new (non power-supplying) powered device with an upper limit power Icut calculated in accordance with an upper limit power allocation Iclass associated with a class determined associated with the powered device, when the upper limit power allocation Iclasss is smaller than the difference of a total power supply and a summed power allocation of then power-supplying connecting ports. The monitoring device is further configured to shut the power source equipment from supplying power to a connecting port, when power consumption of the connecting port exceeds the upper limit power Icut associated with the connecting port, and to record each such shutdown event Ioff_event of the connecting ports and shutdown power Icut_old, which is the peak value of the power consumption at the shutdown event Ioff_eventor the then effective upper limit power Icut.

The monitoring device is further configured to continuously inspect all power-supplying connecting ports to obtain power consumption values along a time axis of the respective connecting ports, when upper limit power allocation Iclass of the new powered device is greater than the difference of a total power supply and a summed power allocation of then power-supplying connecting ports, to adjust the upper limit power Icut of the respective connecting ports with an adjustment value calculated based on the obtained power consumption values and to calculate a new summed power allocation using the adjusted upper limit power values Icut, for the determination of whether to supply power to the connecting port with the new powered device.

According to the preferred embodiments of this invention, the monitoring device adjusts the upper limit power values Icut of the respective connecting ports by:

setting the upper limit power value Icut of a connecting port to an upper limit power allocation Iclass of a class associated with the connecting port, upon supplying power to the connecting port;

continuously inspecting all power-supplying connecting ports to obtain power consumption values along a time axis of the respective connecting ports;

if a connecting port has never encountered a shutdown event (Ioff_event=0), after supplying power, waiting for a first predetermined period, then adjusting the upper limit power value Icut of the connecting port to a value equal to the sum of a peak value of power consumption Ipeak of the connecting port within the first predetermined period and a tolerance value Ibuffer, i.e., Icut=Ipeak+Ibuffer.

if a connecting port has encountered a shutdown event (Ioff_event=1), comparing a peak power consumption value Ipeak of the connecting port with the shutdown power Icut_old effective at the last shutdown event and, when the Ipeak value is greater than the Icut_old value, calculating Ipeak continuously for a second predetermined time, then adjusting the upper limit power Icut of the connecting port to a value equal to the sum of a peak value of power consumption Ipeak of the connecting port after suppling power and a tolerance value Ibuffer, i.e., Icut=Ipeak+Ibuffer. And upon a shutdown event, the upper limit power value Icut of the connecting port being shut down is deducted from the summed power allocation.

The monitoring device may further be configured to reset upper limit power Icut of particular connecting ports to upper limit power allocation Iclass associated with the classification of the connecting ports, upon a shutdown event, whereby an upper limit power value Icut of the connecting port being shut down is deducted from the summed power allocation. The particular connecting ports may be a part or all of the connecting ports.

The present invention also provides a method of supplying power from a power source equipment of a power over Ethernet (PoE) system. The method may be used in a power source equipment of a PoE system, wherein the power source equipment comprises at least two connecting ports, each to be connected to a powered device via a network wire. The power source equipment further comprises an inspection device in connection with the respective connecting ports and configured to detect whether a powered device suited for supplying power is connected with a particular connecting port and to determine a power level to be supplied to the connecting port, and a monitoring device configured to allow the power source equipment to supply power to a connecting port connected with a new (non power-supplying) powered device with an upper limit power Icut calculated in accordance with an upper limit power allocation Iclass associated with a class determined associated with the powered device, when the upper limit power allocation Iclasss is smaller than the difference of a total power supply of the power source equipment and a summed power allocation of then power-supplying connecting ports. The monitoring device is further configured to shut the power source equipment from supplying power to a connecting port, when power consumption of the connecting port exceeds the upper limit power Icut associated with the connecting port, and to record each such shutdown event Ioff_event of the connecting ports and shutdown power Icut_old, which is the peak value of the power consumption at the shutdown event Ioff_event or the then effective upper limit power Icut.

The invented method is actuated, when an upper limit power allocation Iclass of a connecting port connected by a powered device not being supplied power ("new powered device") is greater than the difference of a total power supply of the power source equipment and a summed power allocation of then power-supplying connecting ports. The method continuously inspects all power-supplying connecting ports to obtain power consumption values along a time axis of the respective connecting ports, in order to adjust the upper limit power Icut of the respective connecting ports with an adjustment value calculated based on the obtained power consumption values and to calculate a new summed power allocation using the adjusted upper limit power values Icut, for the determination of whether to supply power to the connecting port with the new powered device.

According to the preferred embodiments of this invention, the monitoring device adjusts the upper limit power values Icut of the respective connecting ports by:

setting the upper limit power value Icut of a connecting port to an upper limit power allocation Iclass of a class associated with the connecting port, upon supplying power to the connecting port;

continuously inspecting all power-supplying connecting ports to obtain power consumption values along a time axis of the respective connecting ports;

if a connecting port has never encountered a shutdown event (Ioff_event=0), after supplying power, waiting for a first predetermined period, then adjusting the upper limit power value Icut of the connecting port to a value equal to the sum of a peak value of power consumption Ipeak of the connecting port within the first predetermined period and a tolerance value Ibuffer, i.e., Icut=Ipeak+Ibuffer.

if a connecting port has encountered a shutdown event (Ioff_event=1), comparing the peak power consumption value Ipeak of the connecting port with the shutdown power Icut_old effective at the shutdown event and, when the Ipeak value is greater than the Icut_old value, calculating Ipeak value continuously for a second predetermined time, then adjusting the upper limit power Icut of the connecting port to a value equal to the sum of a peak value of power consumption Ipeak of the connecting port after supplying power and a tolerance value Ibuffer, i.e., Icut=Ipeak+Ibuffer. And upon a shutdown event, the upper limit power value Icut of the connecting port being shut down is deducted from the summed power allocation. Shutdown event Ioff_event, and shutdown power Icut_old are recorded and are cleared only if the shutdown port is disconnected from power device.

The method may further comprise the step of resetting an upper limit power Icut of particular connecting ports to the upper limit power allocation Iclass associated with the classification of the connecting ports, upon a shutdown event, whereby an upper limit power value Icut of the connecting port being shut down is deducted from the summed power allocation. The particular connecting ports may be a part or all of the connecting ports.

According to this invention, the monitoring device adjusts the upper limit power value Icut of the then power-supplying connecting ports, when a new powered device requests for power supply but has an upper limit allocation Iclass greater than the remaining power allocation value, so that extra power may be allocated to the newly added powered device or a power device with lower priority.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below and the claims. The drawings are not necessarily to scale.

Emphasis is instead generally placed upon illustrating the general principles of the present invention. In these drawings, like numerals are used to indicate like parts throughout the various views.

DETAILED DESCRIPTION OF THE INVENTION

The present invention will be apparent from the following detailed description, which proceeds with reference to the accompanying drawings, wherein the same references relate to the same elements. The present invention provides a novel power source equipment of the PoE system and method used therein to supply power to connecting ports. The present invention discloses a monitoring device that dynamically monitors power consumption of the connecting ports, in order to allocate extra power to a new powered device.

Figure 1:
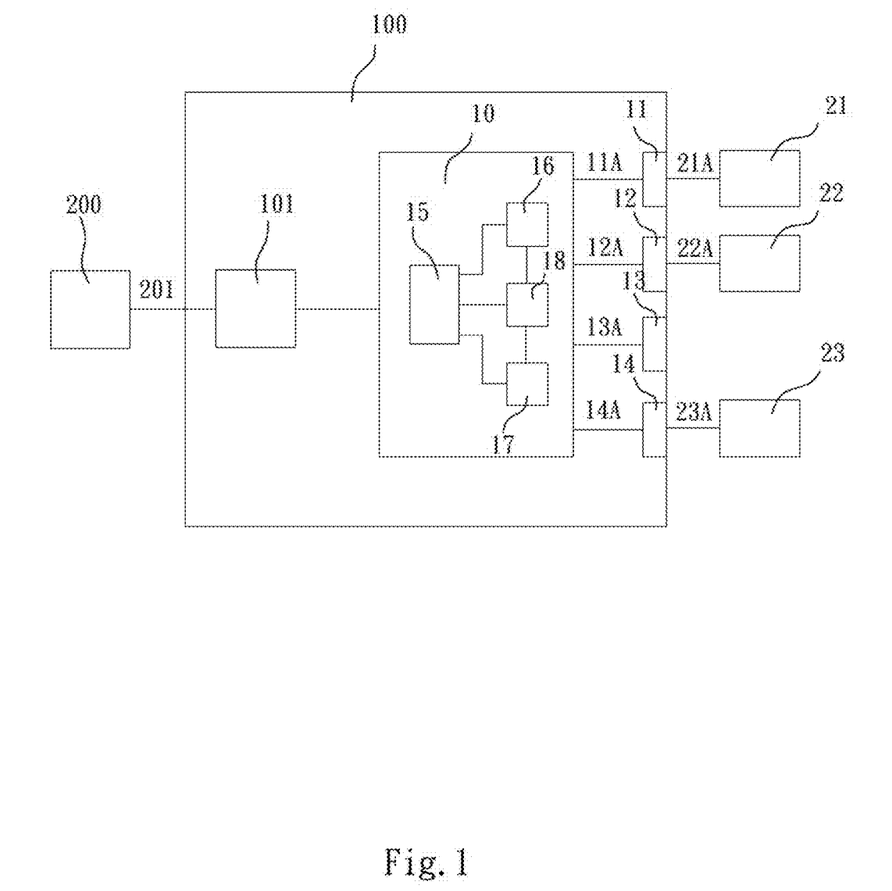
FIG. 1 illustrates an embodiment of the inspection device for power source equipment of the PoE system.

FIG. 1 illustrates an embodiment of the power source equipment for the PoE system. As illustrated, the power source equipment 100 is incorporated in a PoE system and supplies power to a plurality of powered devices. Together with the power source equipment 100 and a power source 200, they constitute the PoE system. The power source equipment 100 provides power, from the power source 200 and through the power cable 201 to the powered devices. As shown in FIG. 1, the power source 200 provides power through the power cable 201 into the I/O Interface 101 of the power source equipment 100, and finally into an inspection device 10. The power source equipment 100 also provides multiple connecting ports 11, 12, 13 and 14. They allow connection to the external devices 21, 22, 23 through the network wire 21A, 22A, and 23A. Although FIG. 1 illustrates only four connecting ports, a person of ordinary skill in the art will recognize that the number of ports can be greater or less than the number illustrated. For example, a typical power source equipment 100 can offer 8 connecting ports. The present invention is applicable to these cases as well. As illustrated, there are three external devices 21, 22, and 23 connecting to the connecting ports 11, 12 and 14. There is no external device connecting to the connecting port 13. The external devices 21, 22 and 23 may be powered devices in compliance with the PoE standard, may be compatible powered devices, may be incompatible powered devices, or may be just a typical capacitor load or resistor load.

The power source equipment 100, via 4 sets of signal wires 11A, 12A, 13A, and 14A, connects to the connecting ports 11, 12, 13, and 14. The function of the power source equipment 100 is to transfer the power from the power source 200 to the external devices 21, 22 and 23 that are capable of receiving power.

In general, the signal wires 11A, 12A, 13A and 14A may each comprises 2 pairs of signal lines for transmitting electric signal and power. At the same time, the network wires 21A, 22A, and 23A may each comprises 2 pairs of signal lines in the shape of a twisted pair. A person of ordinary skill in the art would recognize that the number of lines inside the signal wire or the network wire may vary, as long as each of them has a pair of signal wires.

The PoE system configured as above is well known in the art, and various techniques have been described in the literature, including the IEEE 802.3af and IEEE 802.3at standards.

According to the PoE standard, a standard-compliant power source equipment must first conduct detection and classification toward the external devices 21, 22 and 23 before providing power to a suitable external device. For those devices that are in compliance with, or compatible with, the PoE standard, there currently exist methods and devices to detect and classify these devices, such as the disclosure in the U.S. Pat. Nos. 7,856,561 and 8,412,961.

In an ideal situation, all external devices connected the connecting ports 11, 12 and 14 are powered devices in compliance with or compatible with the PoE standard. During the detection stage, these external devices can be called "target devices." When it is determined that a target device is in compliance with the PoE standard, the device is then called a powered device. In the following description, we will use "target device" to mean an external device that connects to the connecting ports 11, 12 and 14, and "powered device" to mean an external device that complies with or is compatible to the IEEE PoE standard, i.e, an external device determined to be a qualified powered device.

In FIG. 1, the power source equipment 100 includes an inspection device 10 to detect multiple connecting ports 11, 12, 13 and 14 to determine whether the target devices 21, 22 and 23 connected thereto are suitable powered devices. If the determination is positive, it will further determine a power level to be supplied to the powered devices 21, 22 and 23. The inspection device 10 may be a known inspection device for powered devices in the PoE system. It includes an inspection signal generator 16, a response signal receiver 17, and a computing unit 15. In this setting, the inspection signal generator 16 supplies a voltage signal to the specific connecting ports. After a predetermined period, the response signal receiver 17 will receive the response signal from the connecting port. Then, the computing unit 15 will transform the response signal into current signal to determine whether the connecting port has connected to a target device, and if it has, it will determine what the power needed by the powered device is. Alternatively, the inspection signal generator 16 may generate a current signal to be applied to the specific connecting port. After a predetermined time, the response signal receiver 17 may receive the response signal from the connecting port. Then, the computing unit 15 may transform the response signal into a voltage signal. Based on the characteristics of the voltage signal, the computing unit 15 may conduct the above determination. Usually, the predetermined period is less than 500 ms, but the actual time may be adjusted based on the actual application.

The above mentioned structure and functionality of the inspection device 10 are commonly known to a person of ordinary skill in the art, and hence will not be further explained. In the below description, we will use "detection" to mean the step of determining whether the connecting port has connected to a target device and whether the target device is a suitable powered device. We will use "classification" to mean the step of determining the required power for the powered device.

In the present invention, the power source equipment 100 of the PoE system may be used to detect multiple connecting ports 11, 12, 13 and 14 to determine whether the connecting ports 11, 12, 13, and 14 have connected to target devices, and whether the connected target devices are qualified powered devices. If it is, it will determine what the required power shall be. In a preferred embodiment of the present invention, once the computing unit 15 has determined that a connecting port has connected to a powered device, the inspection signal generator 16 may send a classification signal to the connecting port. After it sends a first detection signal/classification signal, it then sends a second detection signal/classification signal to another connecting port that needs the second inspection signal. Such mechanism allows only one single inspection device serve to detect and classify multiple powered devices. It may also be applied by multiple inspection devices, wherein each of the inspection device is used to inspect a single powered device.

In FIG. 1, in addition to the computing unit 15, the inspection signal generator 16, and the response signal receiver 17, the inspection device 10 further includes a monitoring device 18. The monitoring device 18 may be used to dynamically adjust the upper limit of power supply to each of the powered devices from the inspection device 10.

Specifically, the inspection device 10 may determine the power supply classification for a powered device connected to the connecting port based on the classification response signal received in the connecting port. According to the IEEE 802.3af/at standard, the classification may be class 0, 1, 2, 3 or 4. The upper limit power allocation Iclass associated with the classification is, respectively, 15.5 W, 4 W, 7 W, 15.5 W or 30 W. In a preferred embodiment of the present invention, the inspection device 10 supplies an upper limit power Icut to the connecting ports/powered devices based on their classification and the value of the upper limit power Icut is smaller than the upper limit power allocation Iclass associated with the class of the connecting port/powered device. Generally, in the initial phase, the upper limit power Icut is set to the upper limit power allocation Iclass associated with the class of the connecting port.

According to this invention, the monitoring device 18 determines whether a connecting port shall be supplied power and an upper limit power Icut value for each connecting port, and continues monitoring the power consumption of the respective connecting ports, in order to obtain useful information for its determinations. A monitoring device 18 with such functions may be any of the known circuit or software.

According to the preferred embodiments of this invention, the monitoring device 18 is configured to:

Shut the power source equipment 100 from supplying power to a connecting port, when power consumption of the connecting port exceeds the upper limit power Icut associated with the connecting port, and to record each such shutdown event Ioff_event of the connecting ports, as well as shutdown power Icut_old, which is the peak value of the power consumption at the shutdown event Ioff_event or the then effective upper limit power Icut.

Allow the power source equipment 100 to supply power to a connecting port connected with a new (non power-supplying) powered device with an upper limit power Icut calculated in accordance with an upper limit power allocation Iclass associated with a class determined in association with the powered device by the inspection device 10, when the upper limit power allocation Iclasss is smaller than the difference of a total power supply of the power source equipment 100 and a summed power allocation of then power-supplying connecting ports.

Suspend the power source equipment 100 from supplying power to the connecting port connected with the new powered device, when the upper limit power allocation Iclasss is greater than the difference of the total power supply of the power source equipment 100 and the summed power allocation of then power-supplying connecting ports, followed by continuously inspecting all power-supplying connecting ports to obtain power consumption values along a time axis of the respective connecting ports, and adjusting the upper limit power Icut of the respective connecting ports with an adjustment value calculated based on the obtained power consumption values in order to calculate a new summed power allocation using the adjusted upper limit power values Icut, for use in the determination of whether to supply power to the connecting port with the new powered device.

Alternatively, the monitoring device 18 may also allocate the difference of the total power supply of the power source equipment 100 and the summed power allocation of then power-supplying connecting ports to the connecting port with the new powered device, as its initial upper limit power value Icut, when the upper limit power allocation Iclasss of the connecting port is greater than such difference.

In order to adjust the upper limit power values Icut of the respective connecting ports, in the preferred embodiments of this invention, the monitoring device 18 is configured to perform the following operations.

The monitoring device 18 sets the upper limit power value Icut of a connecting port to an upper limit power allocation Iclass of a class associated with the connecting port, upon supplying power to the connecting port.

The monitoring device 18 continuously inspects all power-supplying connecting ports to obtain power consumption values along a time axis of the respective connecting ports.

For a connecting port that has never encountered a shutdown event (Ioff_event=0), the monitoring device 18 waits for a first predetermined period after supplying power to adjust the upper limit power value Icut of the connecting port to a value equal to the sum of a peak value of power consumption Ipeak of the connecting port within the first predetermined period and a tolerance value Ibuffer, i.e., Icut=Ipeak+Ibuffer. In some preferred embodiments, a lower limit of the upper limit power value Icut may be provided, to maintain the Icut value in a proper range.

For a connecting port that has encountered a shutdown event (Ioff_event=1), the monitoring device 18 compares a peak power consumption value Ipeak of the connecting port with the shutdown power Icut_old effective at the last shutdown event and, when the Ipeak value is greater than the Icut_old value, calculating Ipeak value continuously for a second predetermined time, then adjusts the upper limit power Icut of the connecting port to a value equal to the sum of a peak value of power consumption Ipeak of the connecting port after supplying power and a tolerance value Ibuffer, i.e., Icut=Ipeak+Ibuffer. The result of the Ipeak value being greater than the Icut_old value means that the old Icut value set for this connecting port is not enough for normal operation of the corresponding powered device and an increase is needed. However, in case the newly set Icut value is greater than the Iclass value of the related class, the Icut value is set to the Iclass value.

Upon a shutdown event, the monitoring device 18 deducts the upper limit power value Icut of the connecting port being shut down from the summed power allocation. After the deduction, the power reserved for this connecting port may be allocated to a new powered device or a powered device with lower priority. Shutdown event Ioff_event, and shutdown power Icut_old, which is the peak value of the power consumption Ipeak or the then effective upper limit power Icut, of the shutdown port are recorded. Ioff_event and Icut_old are cleared only if the corresponding port is disconnected from power device.

After a connecting port is shut down, no power will be supplied to the connecting port for a period of time, such as 10 seconds. This prevents the connecting port from being shut down from time to time, after power is supplied thereto.

Figure 2:
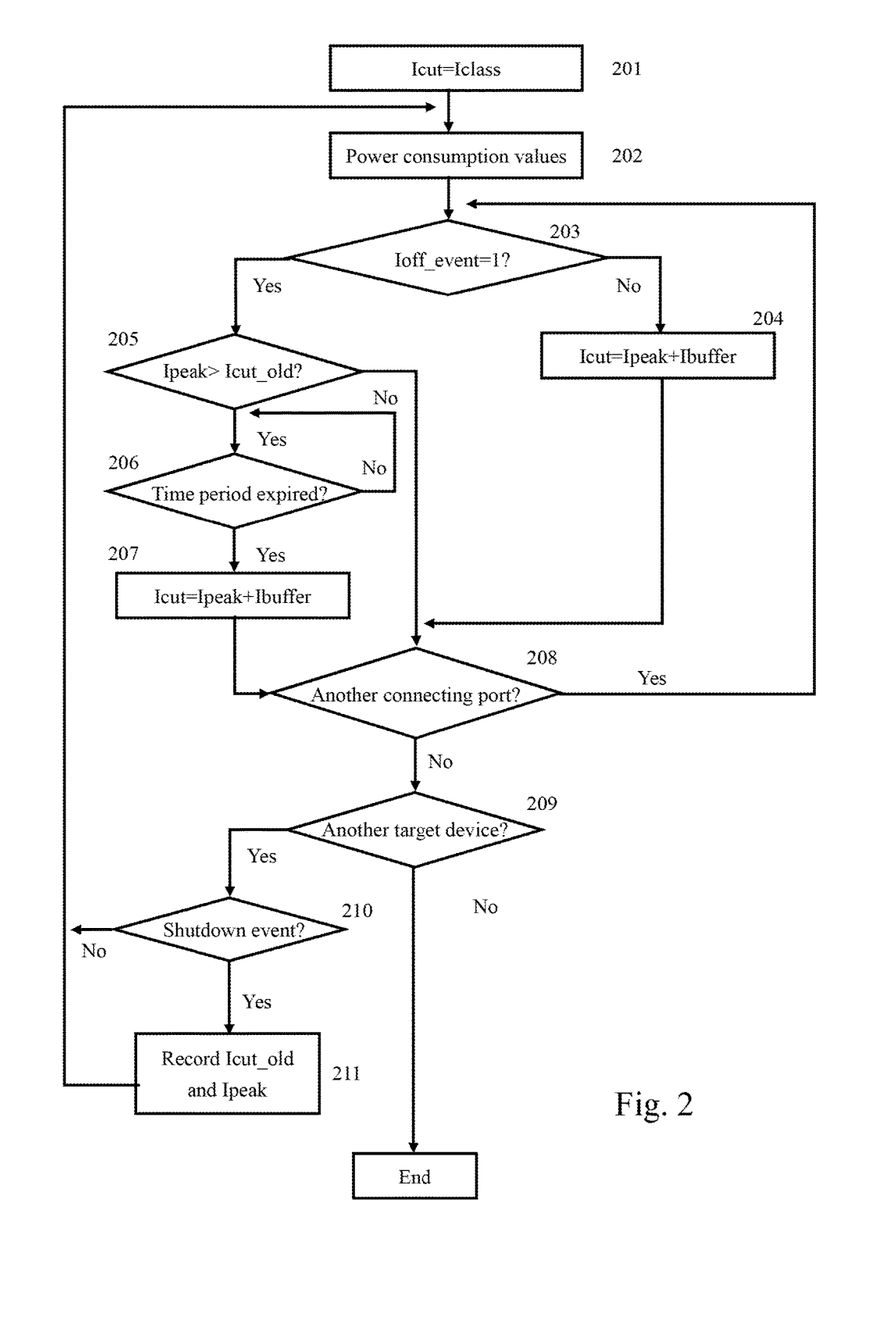
FIG. 2 illustrates a flow diagram of the power supplying method for power source equipment of the PoE system.

The following explanation relates to the power supply method for the PoE system. FIG. 2 illustrates a flowchart of the invented power supply method. The method illustrated may be used by the power source equipment of the PoE system shown in FIG. 1.

As illustrated in FIG. 2, the method begins at step 201, when the upper limit power allocation Iclass of a connecting port connected by a powered device not being supplied power ("new powered device") is greater than the difference of a total power supply of the power source equipment and a summed power allocation of then power-supplying connecting ports. When this happens, the invented method suspends the power source equipment 100 from supplying power to the connecting port connected with the new powered device. Alternatively, the monitoring device 18 may also allocate the difference of the total power supply of the power source equipment 100 and the summed power allocation of then power-supplying connecting ports to the connecting port with the new powered device, as its initial upper limit power value Icut. Thereafter, the method continuously inspects all power-supplying connecting ports to obtain power consumption values along a time axis of the respective connecting ports, for use in adjusting the upper limit power Icut of the respective connecting ports with an adjustment value calculated based on the obtained power consumption values. A new summed power allocation is calculated, using the adjusted upper limit power values Icut, for use in the determination of whether to supply power to the connecting port with the new powered device.

As shown in FIG. 2, the method starts at step 201, where the monitoring device 18 sets the upper limit power value Icut of all connecting ports to an upper limit power allocation Iclass of a class associated with the connecting ports. At step 202, the monitoring device 18 continuously inspects all power-supplying connecting ports to obtain power consumption values along a time axis of the respective connecting ports. At 203, the monitoring device 18 determines whether the connecting ports have encountered a power shutdown event, due to power consumption of the connecting ports is greater than their respective Icut values. For a particular connecting port, if result of the determination is no (Ioff_event=0), at step 204 the upper limit power value Icut of the connecting port is adjusted to a value equal to the sum of a peak value of power consumption Ipeak of the connecting port within the first predetermined period and a tolerance value Ibuffer, i.e., Icut=Ipeak+Ibuffer. Otherwise (Ioff_event=1), at step 205 the peak power consumption value Ipeak of the connecting port is compared with the shutdown power Icut_old effective at the last shutdown event. If the Ipeak value is higher than the Icut_old value, at 206 a time period is preserved and the peak value of power consumption of the connecting port during this second time period, if greater than the Ipeak value, is used to replace the Ipeak value. After expiration of the time period, at 207 the upper limit power Icut of the connecting port is adjusted to a value equal to the sum of the peak value of power consumption Ipeak of the connecting port since the shutdown event and a tolerance value Ibuffer, i.e., Icut=Ipeak+Ibuffer. Alternatively, at step 206 the monitoring device 18 may hold on adjusting the Icut value, until one or more other peak power consumption value greater than the Icut_old value is observed. This helps to obtain a possibly maximum value of the Ipeak value. In the present invention, the time period preserved for peak values or the number of peaks is not any technical limitation, as long as sufficient information is obtained and the operation is not delayed. If result of determination in step 205 or 206 is negative, the upper limit power value Icut is not adjusted. At step 208 the monitoring device 18 determines if another connecting port needs to adjust its Icut value. If yes, the step returns to 203; otherwise, the monitoring device 18 determines if another connecting port is requesting power supply but its Iclass value is determined to be greater than the difference of the total power supply of the power source equipment 100 and the summed power allocation of then power-supplying connecting ports. If yes, it further determines whether a connecting port previously supplied power encounters a shutdown event at step 210. If yes, the Icut value of that connecting port is deducted from the summed upper limit power allocation to obtain a new summed upper limit power allocation, and shutdown event Ioff_event, and shutdown power Icut_old, which is the peak value of the power consumption Ipeak or the then effective upper limit power Icut, are recorded at step 211. Ioff_event and Icut_old are cleared only if the corresponding port is disconnected from power device. The step returns to 202. If result of determination in 210 is negative, the step returns to 202 as well. If result of determination in 209 is negative, the method stops.

In some embodiments, a step of suspending supplying power to the connecting port encountering the shutdown event for a period of time, such as 10 seconds, may be performed after step 211. This helps to prevent the connecting port from being shut down from time to time, after power supply to it is resumed.

According to this invention, the monitoring device 18 adjusts the upper limit power value Icut of the then power-supplying connecting ports, when a new powered device requests for power supply but has an upper limit allocation Iclass that is greater than the remaining power allocation value, so that extra power may be allocated to the newly added powered device or a power device with lower priority.

Although the invention has been described with reference to specific embodiments regarding the inspection device and method for the powered device in a PoE system, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A power source equipment for a power over Ethernet system, the power source equipment comprising at least two connecting ports, each to be connected to a powered device via a network wire, an inspection device in connection with the respective connecting ports and configured to detect a connecting port to determine whether the particular connecting port is connected by a powered device and classify the powered device, and a monitoring device to monitor the power consumption of the respective connecting ports and to adjust power supply to the connecting ports;

wherein the power source equipment is configured to supply power to a connecting port connected with a new (non power-supplying) powered device with an upper limit power Icut calculated in accordance with an upper limit power allocation Iclass associated with a class determined associated with the powered device, when the upper limit power allocation Iclasss is smaller than the difference of a total power supply and a summed power allocation of then power-supplying connecting ports;

and to shut power supply to a connecting port, when power consumption of the connecting port exceeds the upper limit power Icut associated with the connecting port, and to record each such shutdown event Ioff_event of the connecting ports and shutdown power Icut_old, which is the peak value of the power consumption Ipeak at the shutdown event Ioff_event or the then effective upper limit power Icut;

characterized in that the monitoring device is further configured to continuously inspect all power-supplying connecting ports to obtain power consumption values along a time axis of the respective connecting ports, when an upper limit power allocation Iclass of the new powered device is greater than the difference of a total power supply and a summed power allocation of then power-supplying connecting ports, to adjust the upper limit power Icut of the respective connecting ports with an adjustment value calculated based on the obtained power consumption values and to calculate a new summed power allocation using the adjusted upper limit power values Icut, for the determination of whether to supply power to the connecting port with the new powered device.

2. The power source equipment of claim 1, wherein adjustment of the upper limit power values Icut of the respective connecting ports comprises the steps of:

setting the upper limit power value Icut of a connecting port to an upper limit power allocation Iclass of the class associated with the connecting port, upon supplying power to the connecting port;

continuously inspecting all power-supplying connecting ports to obtain power consumption values along a time axis of the respective connecting ports; and for a connecting port having never encountered a shutdown event (Ioff_event=0), after supplying power, waiting for a first predetermined period, then adjusting the upper limit power value Icut of the connecting port to a value equal to the sum of a peak value of power consumption Ipeak of the connecting port within the first predetermined period and a tolerance value Ibuffer, Icut=Ipeak+Ibuffer;

for a connecting port having encountered a shutdown event (Ioff_event=1), comparing the peak power consumption value Ipeak of the connecting port with the shutdown power Icut_old effective at the last shutdown event and, when the Ipeak value is greater than the Icut_old value, calculating Ipeak value continuously for a second predetermined time, then adjusting the upper limit power Icut of the connecting port to a value equal to the sum of a peak value of power consumption Ipeak of the connecting port and a tolerance value Ibuffer, Icut=Ipeak+Ibuffer.

3. The power source equipment of claim 1, wherein when the upper limit power allocation Iclasss of the connecting port with a new powered device is greater than the difference of the total power supply of the power source equipment and the summed power allocation of then power-supplying connecting ports, no power is allocated to the new powered device, or such difference value is allocated to the connecting port with the new powered device, as its initial upper limit power value Icut.

4. The power source equipment of claim 1, wherein the monitoring device is further configured to deduct, upon a shutdown event, the upper limit power value Icut of the connecting port being shut down from the summed power allocation.

5. The power source equipment of claim 4, wherein the monitoring device further suspend power supply to the connecting port being shut down for a period of time.

6. A method of supplying power from a power source equipment of a power over Ethernet (PoE) system, wherein the power source equipment comprises:

at least two connecting ports, each to be connected by a powered device via a network wire;

an inspection device in connection with the respective connecting ports and configured to detect whether a powered device suited for supplying power is connected with a particular connecting port and to determine a power level to be supplied to the connecting port, and a monitoring device configured to allow the power source equipment to supply power to a connecting port connected with a new (non power-supplying) powered device with an upper limit power Icut calculated in accordance with an upper limit power allocation Iclass associated with a class determined associated with the powered device, when the upper limit power allocation Iclasss is smaller than the difference of a total power supply of the power source equipment and a summed power allocation of then power-supplying connecting port and to shut power supply to a connecting port, when power consumption of the connecting port exceeds the upper limit power Icut associated with the connecting port, and to record each such shutdown event Ioff_event of the connecting ports and shutdown power Icut_old, which is the peak value of the power consumption at the last shutdown event Ioff_event or the then effective upper limit power Icut;

said method being actuated, when an upper limit power allocation Iclass of a connecting port connected by a new powered device not being supplied power is greater than the difference of a total power supply of the power source equipment and a summed power allocation of then power-supplying connecting ports and comprising the steps of:

continuously inspecting all power-supplying connecting ports to obtain power consumption values along a time axis of the respective connecting ports;

adjusting the upper limit power Icut of the respective connecting ports with an adjustment value calculated based on the obtained power consumption values;

calculating a new summed power allocation value using the adjusted upper limit power values Icut; and determining whether to supply power to the connecting port with the new powered device in accordance with the newly calculated summed power allocation value.

7. The method of claim 6, wherein the step of adjusting the upper limit power values Icut of the connecting ports comprises the steps of:

setting the upper limit power value Icut of a connecting port to an upper limit power allocation Iclass of a class associated with the connecting port, upon supplying power to the connecting port;

continuously inspecting all power-supplying connecting ports to obtain power consumption values along a time axis of the respective connecting ports;

for a connecting port having never encountered a shutdown event (Ioff_event=0), after supplying power, waiting for a first predetermined period, then adjusting the upper limit power value Icut of the connecting port to a value equal to the sum of a peak value of power consumption Ipeak of the connecting port within the first predetermined period and a tolerance value Ibuffer, Icut=Ipeak+Ibuffer; and for a connecting port has encountered a shutdown event (Ioff_event=1), comparing a peak power consumption value Ipeak of the connecting port with the shutdown power Icut_old effective at the last shutdown event; and when the Ipeak value is greater than the Icut_old value, calculating Ipeak value continuously for a second predetermined time, then adjusting the upper limit power Icut of the connecting port to a value equal to the sum of a peak value of power consumption Ipeak of the connecting port and a tolerance value Ibuffer, Icut=Ipeak+Ibuffer.

8. The method of claim 6, further comprising a step of allocating no power or the difference of the total power supply of the power source equipment and the summed power allocation of then power-supplying connecting ports to the connecting port with a new powered device, as its initial upper limit power value Icut, when the upper limit power allocation Iclasss of the connecting port with the new powered device is greater than such difference value.

9. The method of claim 6, further comprising a step of deducting, upon a shutdown event, the upper limit power value Icut of the connecting port being shut down from the summed power allocation.

10. The method of claim 9, further comprising a step of suspending power supply to the connecting port being shut down for a period of time.

\* \* \* \* \*